United States Patent
Yazawa et al.

(10) Patent No.: US 10,992,842 B2
(45) Date of Patent: Apr. 27, 2021

(54) INFORMATION PROCESSING APPARATUS, CONTROL SYSTEM, IMAGE PROCESSING SYSTEM, AND INFORMATION PROCESSING METHOD TO DERIVE ILLUMINATION CONDITION BASED ON EXPOSURE CONDITION

(71) Applicant: CANON KABUSHIKI KAISHA, Tokyo (JP)

(72) Inventors: Takeshi Yazawa, Kawasaki (JP); Satoshi Wada, Machida (JP); Kei Yoshizawa, Kawasaki (JP); Naomi Yamamoto, Yokohama (JP); Makoto Torigoe, Tokyo (JP); Yuji Konno, Kawasaki (JP); Hiroshi Tajika, Yokohama (JP); Hidetsugu Kagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/460,133

(22) Filed: Jul. 2, 2019

(65) Prior Publication Data
US 2020/0021717 A1 Jan. 16, 2020

(30) Foreign Application Priority Data
Jul. 11, 2018 (JP) .............................. JP2018-131685

(51) Int. Cl.
*H04N 1/60* (2006.01)
*H04N 5/235* (2006.01)
(Continued)

(52) U.S. Cl.
CPC ....... *H04N 1/6088* (2013.01); *H04N 1/40056* (2013.01); *H04N 1/484* (2013.01); *H04N 1/6086* (2013.01); *H04N 1/6097* (2013.01); *H04N 5/2351* (2013.01); *H04N 5/2353* (2013.01); *H04N 5/2354* (2013.01)

(58) Field of Classification Search
CPC .... H04N 1/40056; H04N 1/484; H04N 1/603; H04N 1/6086; H04N 1/6088; H04N 1/6097; H04N 5/23229; H04N 5/2351; H04N 5/2353; H04N 5/2354; G03G 15/043; G03G 15/5016; G03G 15/5029; G06T 2200/28
See application file for complete search history.

(56) References Cited

U.S. PATENT DOCUMENTS

| 6,567,543 | B1 * | 5/2003 | Shiraiwa | H04N 1/6088 |
| | | | | 348/E9.052 |
| 7,428,011 | B1 * | 9/2008 | Hyodo | H04N 1/00278 |
| | | | | 348/231.6 |

(Continued)

FOREIGN PATENT DOCUMENTS

| JP | 2012-044475 A | 3/2012 |
| JP | 2016-054356 A | 4/2016 |

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An illumination condition, which is used to irradiate a print product with light having illuminance higher than normal illumination, is derived based on exposure condition information at the time of photographing.

22 Claims, 18 Drawing Sheets

(51) Int. Cl.
*H04N 1/40* (2006.01)
*H04N 1/48* (2006.01)

(56) References Cited

U.S. PATENT DOCUMENTS

| | | | |
|---|---|---|---|
| 9,459,820 B2* | 10/2016 | Yoshida | G06T 15/506 |
| 2005/0231605 A1* | 10/2005 | Nakami | G06T 5/009 |
| | | | 348/222.1 |
| 2018/0314182 A1* | 11/2018 | Wada | G03G 15/043 |

* cited by examiner

INFORMATION PROCESSING APPARATUS, CONTROL SYSTEM, IMAGE PROCESSING SYSTEM, AND INFORMATION PROCESSING METHOD TO DERIVE ILLUMINATION CONDITION BASED ON EXPOSURE CONDITION

BACKGROUND

Field

One disclosed aspect of the embodiments relates to an information processing apparatus, a control system, an image processing system, and an information processing method for determining an illumination condition for irradiating a print product on which an image is output.

Description of the Related Art

Conventionally, image processing apparatus such as a digital copier, a printer, a facsimile, and the like that use various printing methods such as ink-jet, electrophotography, thermal transfer, and the like have become widespread. In these image processing apparatuses, image processing is performed on input image data using an image processing unit provided in the apparatus or software installed in the apparatus (generally referred to as a printer driver in a case of a printer), and then an image is printed on a recording medium to generate a print product. The image processing executed here is performed on a premise that the print product is viewed under a predetermined environment. Therefore, in an environment different from the assumed environment, the color may not appear to be desirable for the viewer.

Here, a specific example of a case of an ink jet printer will be described. A color image output by the printer is color-designed so as to conform to a color gamut such as standard Red Green Blue (sRGB), which is generally defined by an international standard, using a Cathode-Ray Tube (CRT) as a display device or a liquid crystal monitor. The color gamut of sRGB is specified at a luminance of 80 cd/m$^2$ and a color temperature of 5000 K in a CRT or the like. In this specification, it is assumed to be desirable that print product printed by an ink jet printer in conformity with the color gamut of sRGB be viewed under an environment of light with luminance equivalent to 80 cd/m$^2$. Hereinafter, light having luminance of 80 cd/m$^2$ and color temperature of 5000 K will be referred to as "normal illumination."

For this reason, when the print product is viewed in an illumination environment with luminance or color temperature far apart from the normal illumination, it may be viewed as a color different from the designed desired color as described above. In order to solve such a problem, a technique has been proposed for generating a print product that can be viewed with similar brightness and color as under the normal illumination, even in a viewing environment different from the above-mentioned normal illumination.

In Japanese Patent Laid-Open No. 2012-044475, since a black area in an image looks unnatural due to brightness (reflectivity) of a wall facing directly from the viewing position, a technique for switching a look-up table near the black area according to the brightness of the wall has been proposed. Further, Japanese Patent Laid-Open No. 2016-054356 discloses that diffuse reflection and specular reflection components are independently measured and held for each printing mode, changes in black density and saturation are predicted according to the luminance of the wall, and a print mode for increasing the density and saturation is selected based on the prediction.

As described above, Japanese Patent Laid-Open No. 2012-044475 and Japanese Patent Laid-Open No. 2016-054356 describe an image processing technique for printing so that a print product can be viewed in similar color and brightness to under normal illumination even if it is not in the normal illumination.

On the other hand, it may be required to view the print product at brightness similar to a state in which input image data was captured, instead of viewing the print product with a limited predetermined brightness. For example, there may be a case that an illumination device is installed inside a building and the brightness is checked, in another place, with a print product obtained by photographing an inside of the building without checking in person in the building, or a case that a print product is displayed on a wall surface in a building such as a commercial facility to produce effects as if there is a window there and light from the outside is coming in.

In both Japanese Patent Laid-Open No. 2012-044475 and Japanese Patent Laid-Open No. 2016-054356, although it can be expected that the viewing result with high fidelity is brought about to a color space defined by a predetermined brightness, it is not considered to reproduce brightness of a state that the input image data is photographed in an environment where the print product is to be viewed.

SUMMARY

The image processing apparatus according to the disclosure is an information processing apparatus that determines an illumination condition for irradiating a print product with light having higher illuminance than normal illumination in a case of exhibiting the print product that an image is printed on a recording medium based on image data obtained by photographing. The information processing apparatus includes a processor, and a memory containing instructions that, when executed by the processor, cause the processor to perform operations including obtaining exposure condition information at a photographing timing of the image data, and deriving the illumination condition based on the exposure condition information at the photographing timing obtained in the obtaining.

Further features of the disclosure will become apparent from the following description of exemplary embodiments (with reference to the attached drawings).

DESCRIPTION OF THE EMBODIMENTS

First Embodiment

In the following, an embodiment of the disclosure will be described with reference to the drawings. Although candelas ($cd/m^2$) are used as a unit of light intensity, the disclosure is not limited to this, and lumens (lm) or lux (lx) may be used.

Figure 4:
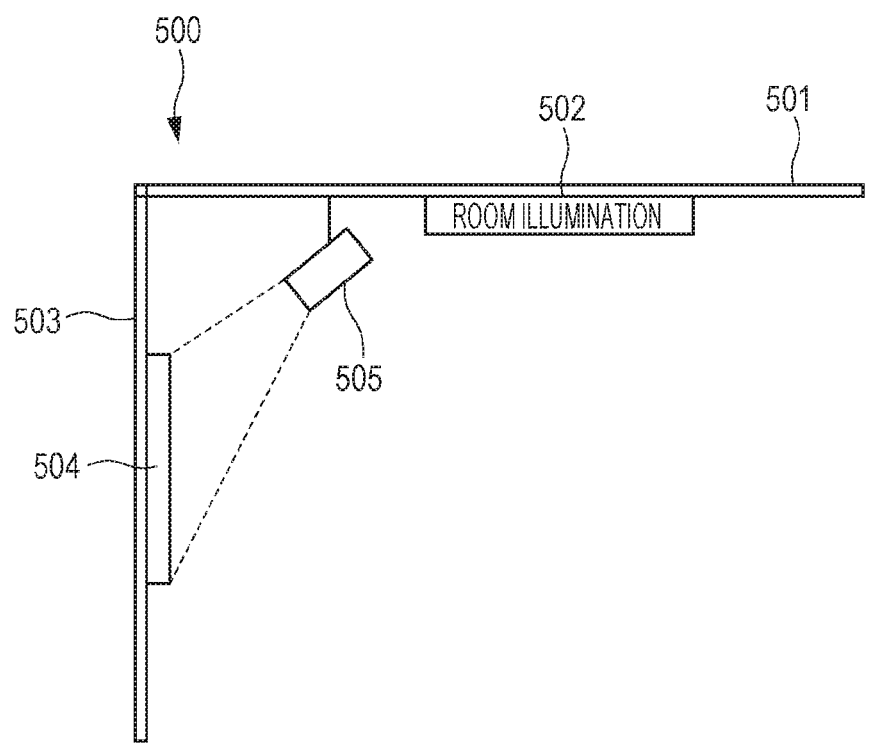
FIG. 4 is a conceptual diagram illustrating a positional relationship between a print product and lighting.

A viewing environment of a print product according to the present embodiment will be described with reference to FIG. 4. In the present embodiment, auxiliary illumination for irradiating the print product with light is used so that a viewer can view the print product in an environment in which a brightness of a photographed state of the image is reproduced. This figure is a conceptual view of a room 500 seen in cross section. A room light 502 is installed on a ceiling 501, and a print product 504 output by an ink jet printer, which is an image output device, is displayed on a wall 503. The broken lines in the figure represent a condition that an auxiliary illumination 505 irradiates the print product 504. Note that a method of reproducing a brightness of a photographed state of an image is not limited to the above method, and there may be a method of adjusting the illumination of the room without using the auxiliary illumination.

Next, a configuration for performing image processing and information processing according to the present embodiment will be described.

Figure 1A:
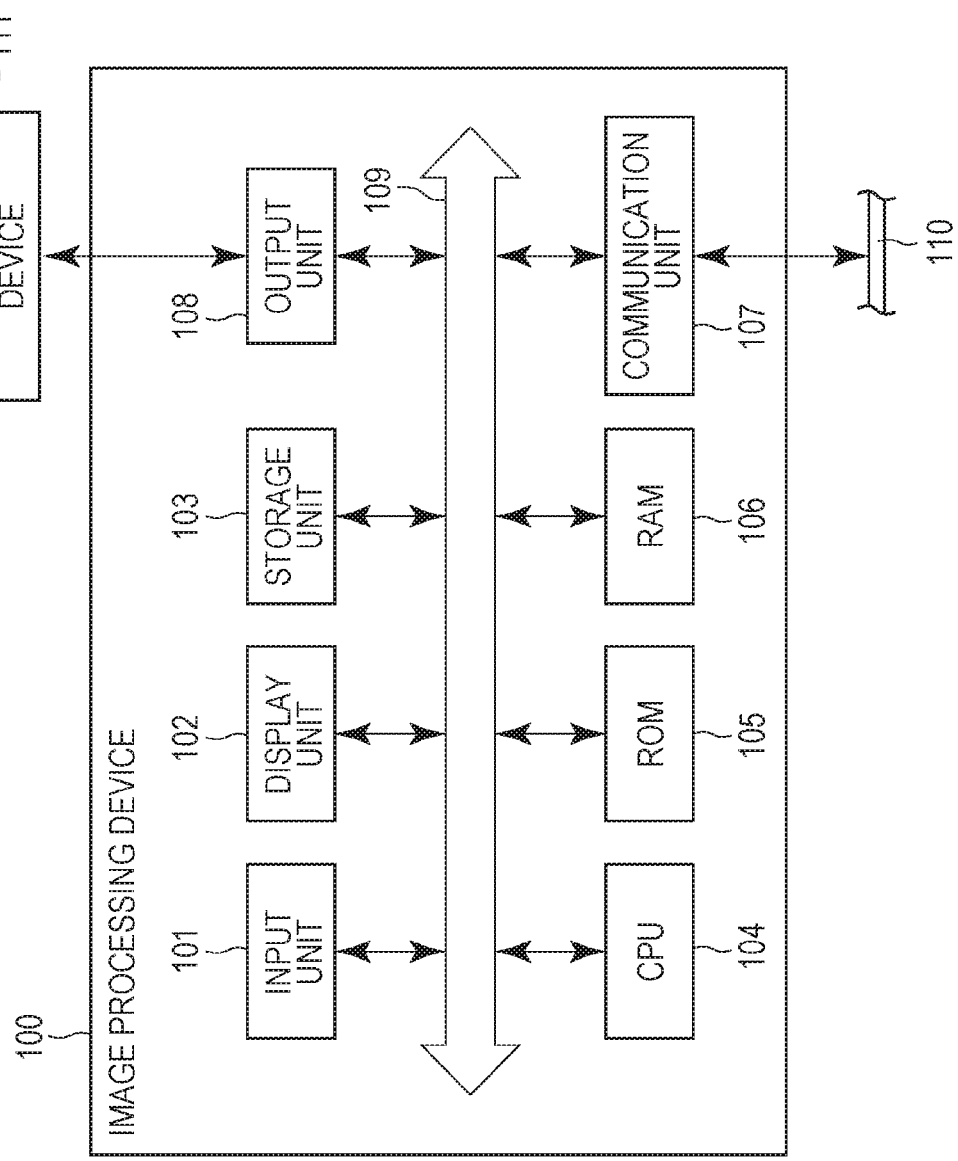
FIGS. 1A and 1B are block diagrams illustrating a configuration of an image processing apparatus and an image output device.

FIG. 1A illustrates a configuration example of an information processing apparatus that functions as an image processing apparatus 100 according to the present embodiment. A Central Processing Unit (CPU) 104 executes an Operating System (OS) and various programs stored in a Read Only Memory (ROM) 105 and a storage unit 103 using a Random Access memory (RAM) 106 as a work memory, and controls a later described configuration via a system bus 109.

The input unit 101 is a serial bus interface such as Universal Serial Bus (USB), and is connected with an input device such as a keyboard and a mouse, and an image input device such as a memory card reader, a digital camera, and a scanner. The CPU 104 inputs a user instruction, image data, and the like via the input unit 101, and displays a graphic user interface (GUI), an image, processing progress, a result, and the like on a display unit 102, which is a monitor.

The storage unit 103 is a recording medium such as a hard disk drive (HDD) or a solid state drive (SSD) in which various programs and various data are stored. The programs stored in the storage unit 103 include a later described program, which realizes image processing.

A communication unit 107 is a network interface for connecting to a wired or wireless network 110 such as Ethernet (registered trademark), Bluetooth (registered trademark), Wi-Fi, or P2P. An output unit 108 is a serial bus interface such as USB, and outputs image data and the like to an image output device 111 and a memory card writer connected to the serial bus.

The CPU 104 communicates with a server device and other computer devices on the network 110 via the communication unit 107. The CPU 104 can receive various programs and data from the server device and other computer devices on the network 110 to execute processing, and provide data of a processing result to the server device and other computer devices on the network 110. The computer device that can communicate with the CPU 104 via the communication unit 107 includes the image output device 111, and image data can be output to the image output device 111.

The image processing apparatus 100 is realized by supplying a program that causes a computer device such as a personal computer, a tablet, or a smartphone to perform later described image processing. When a tablet or a smartphone is used as the image processing apparatus 100, the input unit 101 and the display unit 102 may be laminated and configured as a touch panel.

Figure 1B:
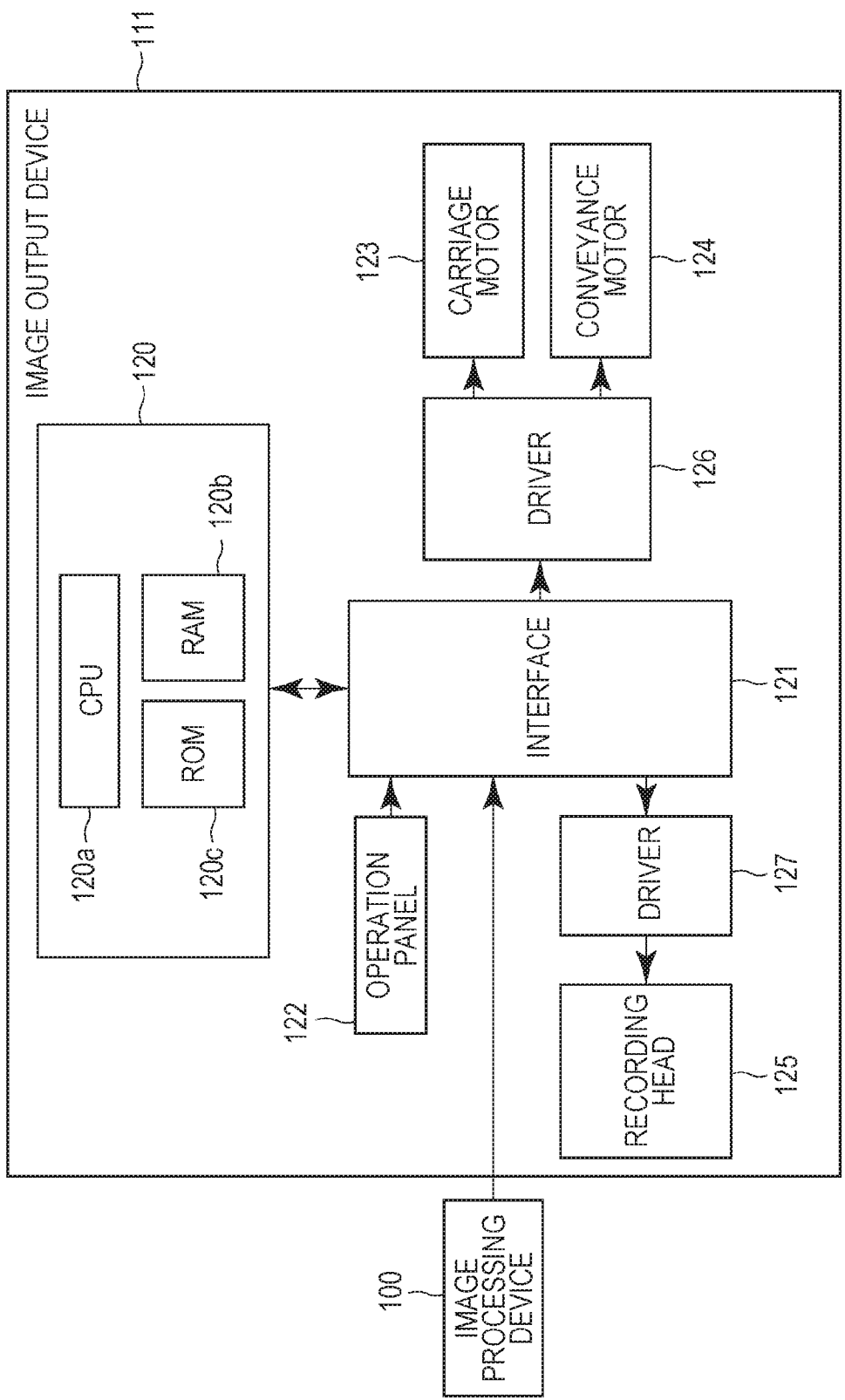

FIG. 1B is a block diagram illustrating a configuration example when the image output device 111 is assumed to be an ink jet printer. The control unit 120 includes a CPU 120a such as a microprocessor, a RAM 120b, a ROM 120c, and the like as a memory. The RAM 120b is used as a work area of the CPU 120a, and also temporarily stores various types of data such as image data received from the image processing apparatus 100 and generated print data. The ROM 120c stores various types of data such as a control program of the CPU 120a and a parameter necessary for printing operation.

The control unit 120 performs processing of inputting and outputting data used for recording image data and the like and parameters to and from the image processing apparatus 100 via an interface 121. In addition, processing for receiving an input of various information, such as a character pitch and a character type, from an operation panel 122 is performed. The control unit 120 also outputs an ON signal or an OFF signal for driving a carriage motor 123 and a conveyance motor 124 from a driver 126 via the interface 121. Further, an ejection signal or the like is output to a driver 127 to control the drive for ejecting the ink from a recording head 125. Each process described above is executed by the control unit 120 reading a program stored in the RAM 120b.

Although FIGS. 1A and 1B illustrate an example of an image processing system in which the image processing apparatus 100 and the image output device 111 are separately configured, the disclosure is not limited to the above embodiment. The image processing apparatus 100 and the image output device 111 may be an integrated image forming apparatus. For example, a part of the processing of the image output device may be executed as so-called printer driver software in the image processing apparatus. Furthermore, the disclosure can also be applied to an image copying apparatus or the like provided with an image reading apparatus.

Figure 2:
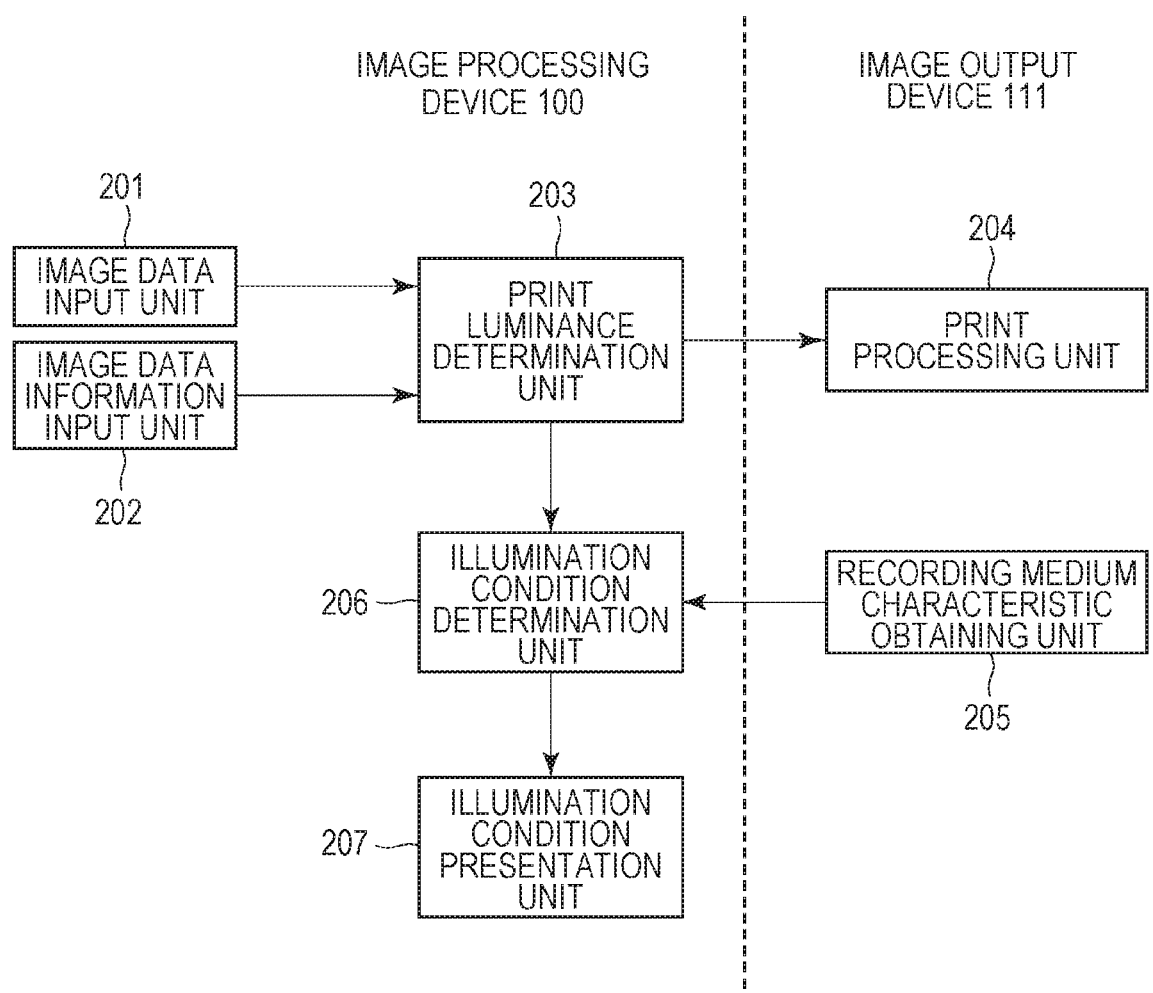
FIG. 2 is a diagram illustrating an example of processing configuration of the image processing apparatus and the image output device.

FIG. 2 is a block diagram illustrating an example of the processing configuration of the image processing apparatus 100 and the image output device 111 illustrated in FIGS. 1A and 1B. The processing configuration illustrated in the figure is realized by supplying the image processing apparatus 100 and the image output device 111 with a program for realizing the processing configuration and the function thereof and having the program executed.

Image data is input from a digital camera or the like through an image data input unit 201 and, at the same time, information at the time of photographing such as exposure condition information or image data information such as luminance dynamic range information is input through an image data information input unit 202. A print luminance determination unit 203 generates print data (output luminance data) for printing from the input image data and image data information. A specific generation method in the print luminance determination unit 203 will be described in detail later. Generated print data is sent to a print processing unit 204 in the image output device 111. Then, after each processing is performed in the image output device 111, the print product is output.

Then, an illumination condition determination unit 206 calculates an illumination condition necessary to reproduce the brightness of the photographed state of the image based on the input information at the time of photographing. The calculated illumination condition is displayed on the display unit 102 by an illumination condition presentation unit 207. The method of calculating the illumination condition will be described in detail later.

Figure 3A:
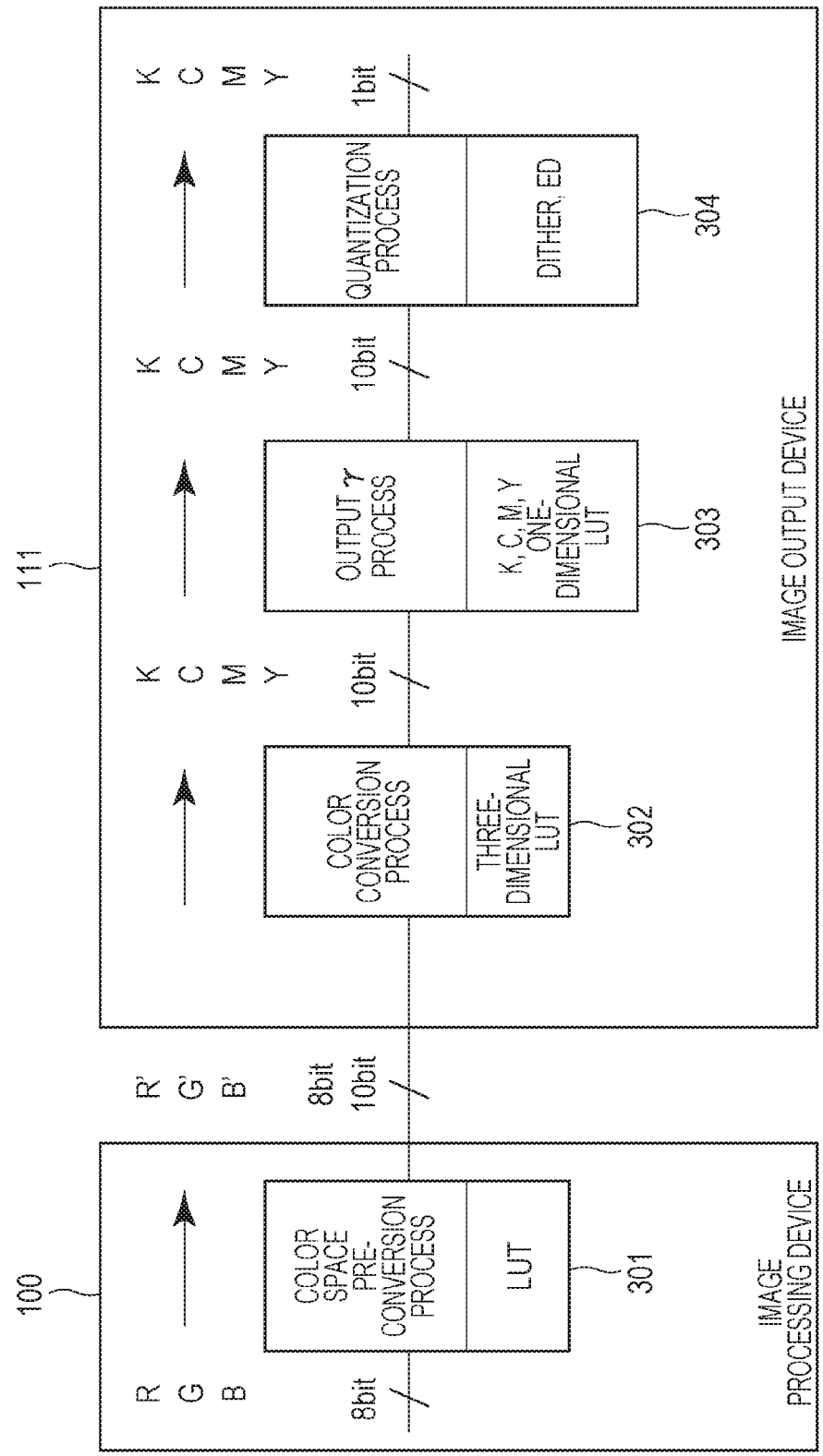
FIGS. 3A and 3B are diagrams illustrating an image processing flow.

FIG. 3A illustrates an image processing configuration for printing color input image data on a recording medium when the image output device 111 is assumed to be an ink jet printer. Here, the print processing unit 204 of the image output device 111 receives image data (luminance data) of 256 gradations of 8 bits of each color of red (R), green (G), and blue (B) included in a general image file such as Joint Photographic Expert Group (JPEG). After a plurality of processes are performed, finally, one bit of bit image data (recording data) that indicates necessity of ink droplet ejection of respective black (K), cyan (C), magenta (M), and yellow (Y) is output. The following describes the processes.

First, the image processing apparatus 100 receives, from a digital camera or the like, input image data represented by 8-bit luminance signals of each color R, G, and B. Then, a color space pre-conversion process 301 is performed on the received luminance signal data of R, G, and B. In this example, the data is converted into R', G', and B' data of 8 bits for each color or 10 bits for each color, using a three-dimensional lookup table (LUT). The color space pre-conversion process 301 is performed to correct a difference between a color space represented by the input R, G, and B image data and a color space reproducible by the image output device 111. Specifically, after RGB to XYZ conversion as color space conversion, which is referred to as color gamut mapping processing, XYZ to R'G'B' conversion is performed, so that the color gamut of the input data is converted to a printer-expressible color gamut. Here, the luminance range of the input data, that is, a Y component in the XYZ data is converted into a luminance range that can be expressed by the image output device. As a result, the luminance range that can be expressed by the image output device corresponds to a luminance range of a print product under a normal illumination. The brightness range will be described in detail later.

Next, the data of each color R', G' and B' that the color space pre-conversion process 301 and the luminance conversion process are simultaneously performed is sent from the image processing apparatus 100 to the image output device 111. In the image output device 111, the color conversion process 302 for converting into 10-bit data of each color K, C, M, and Y using a three-dimensional LUT is performed on the data of each color R', G', and B' that the color space pre-conversion process 301 has been performed. In the color conversion process 302, the RGB system image data of the input system represented by the luminance signal is color converted into ink color data corresponding to each of the K, C, M and Y inks used in the image output device 111.

Figure 3B:
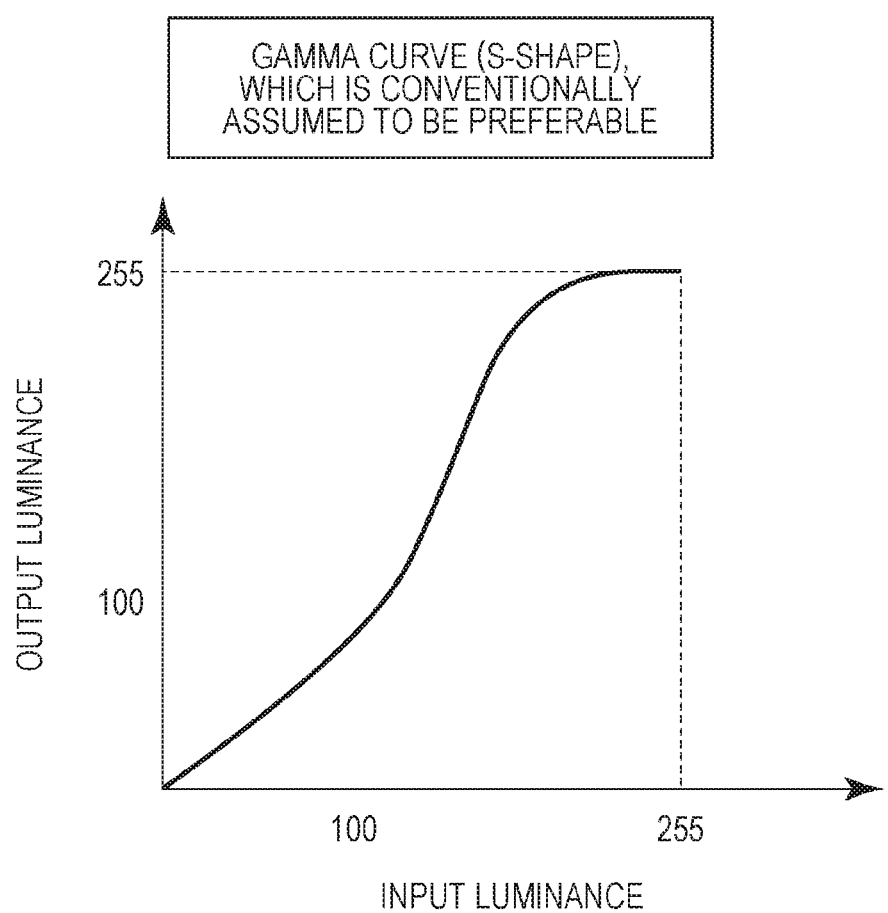

Next, an output γ process 303 is applied to the 10-bit ink color data of each color K, C, M, and Y subjected to the color conversion process 302 using a one-dimensional LUT corresponding to each color. FIG. 3B illustrates an example of a gamma curve (S-shape γ) used in the output γ process 303. In general, the relationship between a number of ink droplets (dots) applied per unit area of the recording medium and the recording characteristics such as reflection density obtained by measuring the recorded image does not have a linear relationship. Therefore, it is necessary to correct the input gradation levels of each of the four colors so that 10-bit input tone levels of each color K, C, M, and Y and density levels of the image recorded thereby have a linear relationship. In other words, the purpose of the γ process is to more faithfully reproduce the input image data when the print product is output by the image output device. In general, even if the input image data is subjected to linear conversion process and output as it is in the image output device, the result of the print product does not have a linear relationship with the input image due to characteristics of the recording medium. Therefore, it is needed to measure the characteristics of the recording medium to be used in advance, and to design a gamma curve in which the input and output have a more linear relationship.

Referring back to FIG. 3A, a quantization process 304 such as dither or error diffusion processing (ED) is performed on the ink color data subjected to the output γ process 303. More specifically, the 10-bit data of each color K, C, M, and Y is converted into 1-bit binary data of each color indicating ejection or non-ejection of ink droplets. Ink droplets are ejected from the recording head 125 based on the converted binary data, and an image is printed on a recording medium.

Figure 5A:
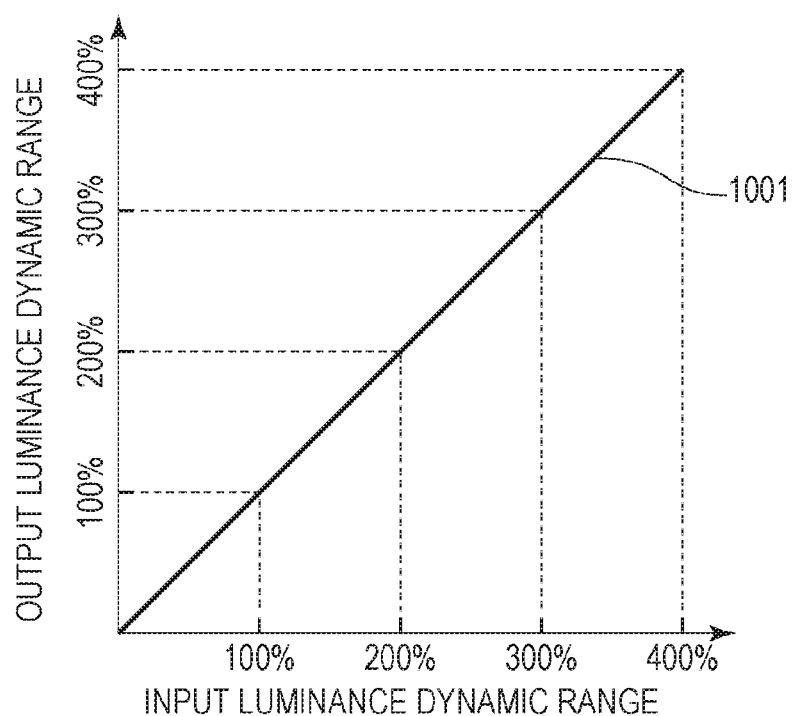
FIGS. 5A and 5B are diagrams illustrating a relationship between an input luminance range and an output luminance range.

Next, the relationship between an input luminance range and an output luminance range in the luminance conversion process performed simultaneously with the color space pre-conversion process 301 will be described with reference to FIG. 5A. This figure illustrates a case where an input luminance range is linearly converted to an output luminance range. When the output luminance range of the print product can sufficiently express the luminance range of the input data, conversion may be performed such that the output becomes linear with respect to the input as illustrated by the solid line 1001 in the figure. However, in general, the luminance range that can be expressed with a print product printed on a non-luminous material such as paper under normal illumination is narrower than the input luminance range. The output luminance on paper, which is a maximum luminance on paper white, is determined by strength of the illumination that is illuminated on the print product in an environment where the output luminance on paper is to be viewed. In general, when the color design in the ink jet printer is an sRGB color space, the luminance dynamic range is performed on an assumption of 0 to 80 cd/m². Therefore, if the luminance range of the input image data is in the range of 0 to 80 cd/m², processing is performed such that the luminance range does not change. However, it is needed to apply conversion processing to input image data in a luminance range exceeding the above range, so as to fall within the luminance dynamic range that can be expressed on the output side, that is, on a recording medium.

Figure 5B:
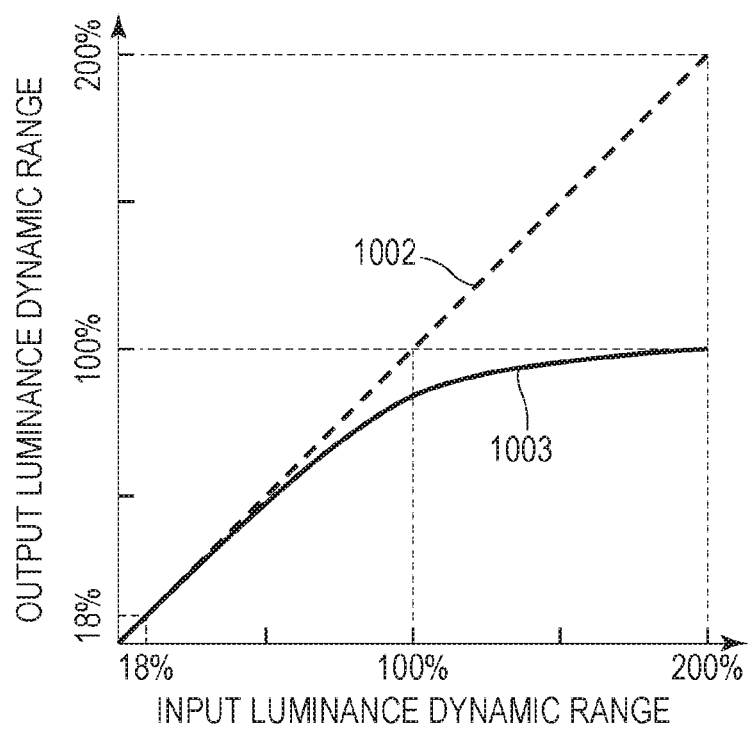

FIG. 5B is a diagram illustrating a normal conversion process performed assuming that a print product printed on a recording medium such as paper is observed under normal illumination. This figure is an example illustrating luminance conversion (gamma curve) for outputting, by an ink jet printer, input image data having a luminance dynamic range of 0 to 200%. In this example, conversion processing that is curved as represented by the solid line 1003 is performed instead of linear conversion as represented by the broken line 1002.

When an image is output to a recording medium such as paper which is a non-light emitting body, a maximum value of the reflectivity is 100%. Here, the luminance of a white background (hereinafter, referred to as a paper white area) of glossy paper is assumed to have a reflectivity of 100%, and in the case of sRGB described above, the luminance is defined as 80 cd/m². Therefore, the luminance 80 cd/m² of the paper white area of glossy paper corresponds to the reflectivity of 100%. In normal processing assuming that observation is performed under normal illumination, input image data having a dynamic range of 0 to 200% is converted as illustrated by the solid line 1003. Note that, so-called 18% gray reflectivity, which is close to human skin color reflectivity, generally maintains output luminance similar to that of input image data. Therefore, in general, a gamma curve in which the solid line 1003 overlaps the broken line 1002 is used in the range of 0 to 18% as illustrated in this figure. Also, the shape of the curve can be modified according to designer's intention.

(Print Data Generation Process)

Next, a method of generating output luminance data, which is print data in the print luminance determination unit 203 of the image processing apparatus 100 of FIG. 2, will be described. As described above, according to the disclosure, the illumination condition is actively controlled in order to reproduce the brightness of the photographed state when the viewer views the print product. Therefore, in the disclosure, it is assumed that the brightness of the photographed state is higher than the luminance when the normal illumination source with luminance of 80 cd/m² irradiates the print product. In other words, in order to reproduce the brightness of the photographed state, it is needed to irradiate the print product with light of illuminance higher than that of the normal illumination.

According to the present embodiment, the image data input to the image data input unit 201 of the image processing apparatus 100 is RGB image data in which RAW data used in a recent digital camera or the like is subjected to linear gradation processing. The RAW data is unprocessed image data before being subjected to various processing inside the camera and converted into JPEG data. A luminance dynamic range of the RAW data is generally wider than a luminance dynamic range of JPEG data. While RAW data is input to the image data input unit 201, photographic information of the RAW data such as an exposure condition is input to the image data information input unit 202. This can be received as exchangeable image file format (Exif) data of the digital camera. The Exif data includes a dynamic range of image data and an exposure correction value (EV value) which is an exposure setting at the time of photographing.

As described above, in the print luminance determination unit 203, RGB luminance data as input image data is subjected to conversion from RGB to XYZ, and then conversion from XYZ to R'G'B' is performed to determine a pixel value of each pixel.

Figure 6A:
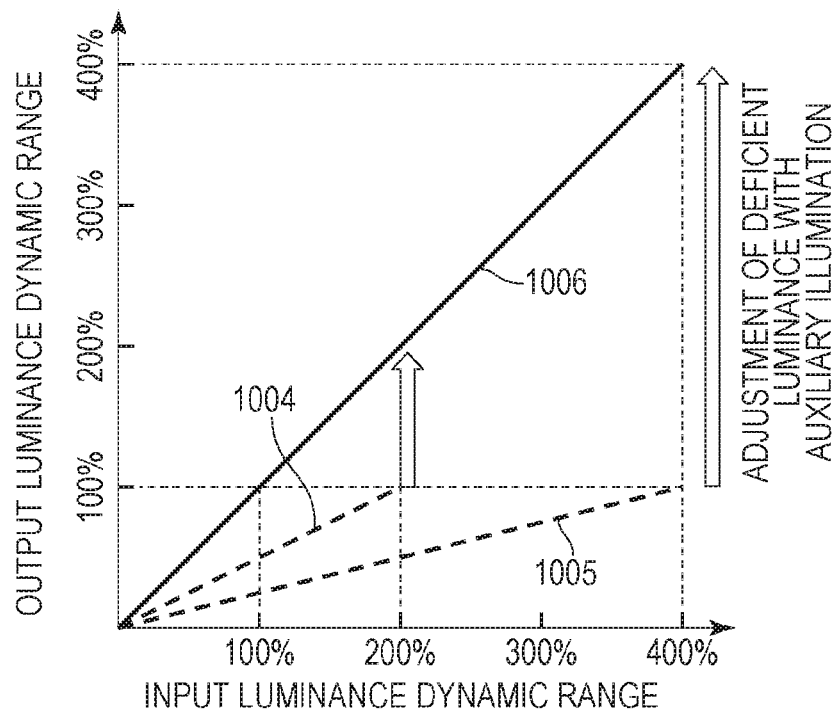
FIGS. 6A and 6B are diagrams illustrating a relationship between the input luminance range and the output luminance range.
Figure 6B:
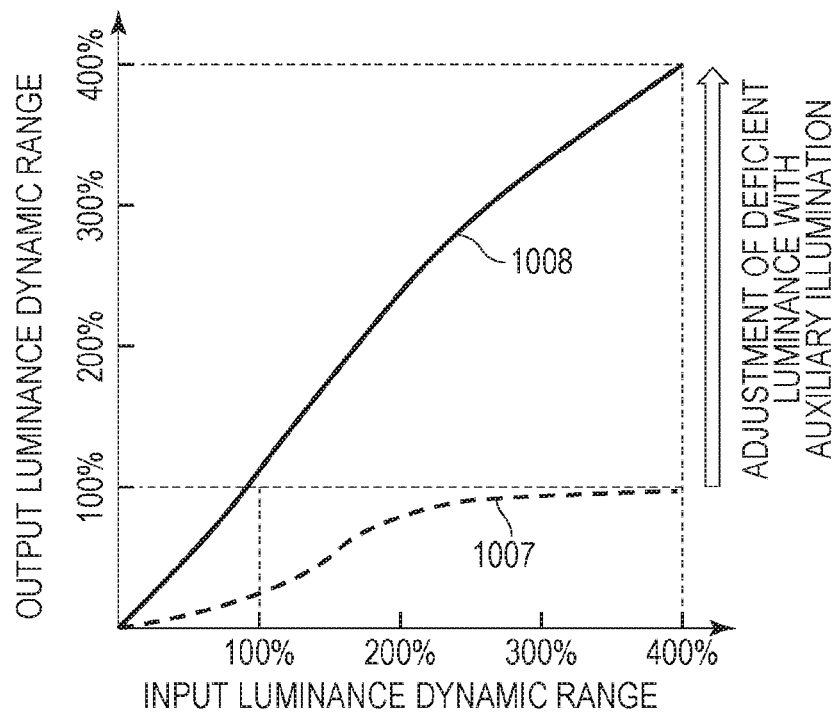

FIGS. 6A and 6B are diagrams illustrating the relationship between the input luminance dynamic range and the output luminance dynamic range in the luminance conversion process according to the present embodiment. First, the following will describe a case where the information input to the image data information input unit 202 is, for example, RAW image data having a dynamic range of 0 to 200%, and information that means an exposure correction value is −1, that is, one step under. Here, when photographed with the exposure correction value of −1, the digital camera side converts an output luminance to be ½ of an input luminance in a case of a proper exposure (that is, in a case where the exposure correction value is 0). Then, the converted data is input to the printer. The data input here is data converted such that the luminance value of the input luminance dynamic range 200% is ½, as indicated by the broken line 1004 in FIG. 6A. That is, the output luminance dynamic range falls within 100%. In a similar manner, when the data is RAW image data having a dynamic range of 0 to 400% and photographed with the exposure correction value of −2, the output luminance is converted to be ¼ of the input luminance on the digital camera side. The converted data is then input to the printer. The data input here is data converted such that the luminance value of the input luminance dynamic range 400% is ¼, as indicated by the broken line 1005 in FIG. 6A. Also in this case, the output luminance dynamic range falls within 100%. Therefore, in any of the above two examples, the output luminance is converted so as to fall within the range of 0 to 100%, and since the luminance is reproducible on the printer side, it is not necessary to further narrow the luminance value.

On the other hand, when the input image data is RAW image data having a luminance dynamic range of 0 to 400% and the exposure correction value is −1, that is, information that indicates one step under, the input data is data in which luminance value of 400% is converted into ½ of the luminance value. In this case, the range of luminance values reproducible on the printer side is exceeded. Therefore, it is necessary to perform conversion so that the output luminance falls within 0 to 100% reproducible by the printer. The broken line 1007 in FIG. 6B indicates data converted on the printer side.

In the present embodiment, by using auxiliary illumination or adjusting illuminance of a fixed illumination, the print product is irradiated with light having an illuminance higher than that of the normal illumination assuming a brightness of 80 cd/m². With this configuration, the luminance of the broken line 1004 and the broken line 1005 in FIG. 6A is raised to the luminance indicated by the solid line 1006, and the luminance of the broken line 1007 in FIG. 6B is raised to the luminance indicated by the solid line 1008. Therefore, in any case of the broken lines 1004, 1005, and 1007, when the print product output on the recording medium is viewed under normal illumination, it looks like a very dark image, compared with the print product output by the normal processing illustrated in FIG. 5B.

The reason for using RAW data in the present embodiment is that RAW data can be processed linearly, and an image of 18% gray is retained even if the auxiliary illumination is applied to the print product, so an image having an appropriate exposure of the photographed state can be reproduced. In addition, since the RAW data has a high number of gradation levels of 12 bits to 16 bits in one pixel, an image having a smooth gradation can be obtained even when image processing is performed, and there is an advantage in that the image quality is less deteriorated.

(Brightness Calculation Processing at the Time of Photographing)

Next, the following will describe a method of analyzing brightness of a photographed state, which is a feature of the disclosure. Through the image data input unit 201 of FIG. 2, information related to settings when an image is photographed is input together with the image data. According to the present embodiment, what is required to reproduce the brightness of the photographed state is information on exposure setting at the time of photographing.

In general, the exposure setting value is called an exposure value (EV), and is a value determined by the following Equation (1) from an aperture value (AV) and an exposure-time time value (TV).

$$EV = AV + TV \quad (1)$$

Note that the AV and the TV can be obtained from an aperture value A and an exposure time T, which are setting parameters at the time of photographing by a camera, by the following Equations (2) and (3).

$$AV = \log_2(A^2) \quad (2)$$

$$TV = \log_2(1/T) \quad (3)$$

The relationship between the brightness of the photographed state and the exposure setting is generally handled as a concept of normal exposure, and the relationship is widely used in exposure setting that the camera automatically performs and a exposure meter that derives a exposure condition at the time of photographing from the brightness of the state. According to the concept of normal exposure, a brightness value (BV) indicating brightness of a state and a sensitivity value (SV) indicating sensitivity of the photographing medium have a relationship expressed in Equation (4) below with the EV value.

$$BV + SV = EV \quad (4)$$

Here, the BV and SV can be expressed as in the following Equations (5) and (6) by the luminance of the photographed state (B[cd/m$^2$]) and the photographing medium sensitivity ISO (Sx).

$$BV = \log_2(B/NK) \quad (5)$$

$$SV = \log_2(N \cdot Sx) \quad (6)$$

Here, it is assumed that K=12.5 and N=0.32.

Therefore, it can be understood that only the EV and the SV are needed to obtain a luminance B of the photographed state. These pieces of information are generally stored in Exif information together with image data photographed by a digital camera and exchanged between the image input device and the output device, and the pieces of information can be obtained as A indicating an aperture value, T indicating exposure time, and Sx indicating photographing medium sensitivity ISO. Based on the above relational expression, the luminance B [cd/m$^2$] of the photographed state can be derived by calculation expressed in the following Equation (7).

$$B = 2^{(EV-SV)} \cdot N \cdot K \quad (7)$$

According to the concept of normal exposure, a state captured by a finder as a subject is treated as a state with 18% reflectivity, and exposure setting for photographing is set so that the state with 18% reflectivity can be expressed with a predetermined brightness when outputting a recorded image. Therefore, by obtaining the luminance B of the photographed state, it is possible to obtain the luminance of the subject captured by the camera with the reflectivity of 18% at the time of photographing.

On the other hand, a width of the dynamic range (also referred to as a D range) that can be captured by a camera is determined based on the sensitivity of the imaging medium and is generally considered to be approximately 10 to 11 steps. One step means that an amount of light captured by the camera is doubled. Therefore, the D range of the camera is about $2^{10}$ to $2^{11}$ times.

Figure 7A:
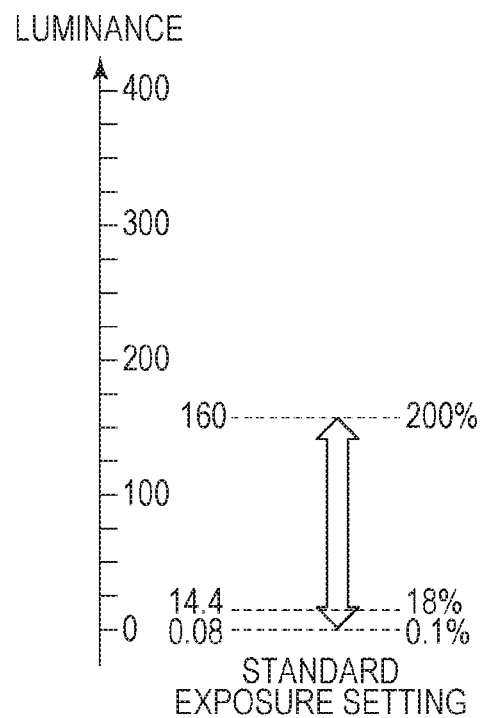
FIGS. 7A and 7B are conceptual diagrams for deriving brightness of a photographed state.

Here, the D range captured by the camera will be described with reference to FIGS. 7A and 7B. In a case where there is a camera with 11 steps of D range, and the maximum reflectivity up to 200% can be captured, the minimum reflectivity that can be captured is approximately 0.1% of 1/2000. At the time of photographing, if a subject with brightness of 14.4 cd/m$^2$ is photographed in accordance with the exposure setting, this is interpreted as 18% reflectivity and image data is formed. In this case, the reflectivity 200% at which the D range becomes maximum corresponds to 160 cd/m$^2$, and the reflectivity 0.1% at which the D range becomes minimum corresponds to 0.08 cd/m$^2$. In other words, it can be considered that the image data has brightness of 160 cd/m$^2$ at maximum. Therefore, when exhibiting the print product, in which the image data is printed on the recording medium, the brightness of the photographed state can be reproduced by setting illumination so that a white area of the print product has brightness of 160 cd/m$^2$ at maximum.

Figure 7B:
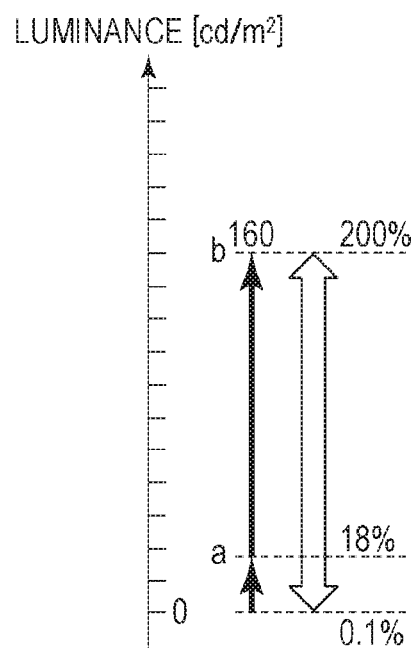

As described above, in order to obtain the brightness of the photographed state, as illustrated in FIG. 7B, the reflectivity of 18% is set at the time of photographing, and luminance B of the photographed state is obtained by using Equation (7) based on the exposure setting and this derived result is assumed as a. Furthermore, the reflectivity b of the maximum D range that can be captured by the camera is obtained. In the present embodiment, the reflectivity of the maximum D range is derived as 200%. This corresponds approximately to the reflectivity of the maximum D range of a general camera. b can be calculated by the following Equation (8).

$$b = a \cdot 200/18 \quad (8)$$

By such a method, it is possible to derive the maximum luminance b captured by the camera in the state that the image is captured.

Figure 8A:
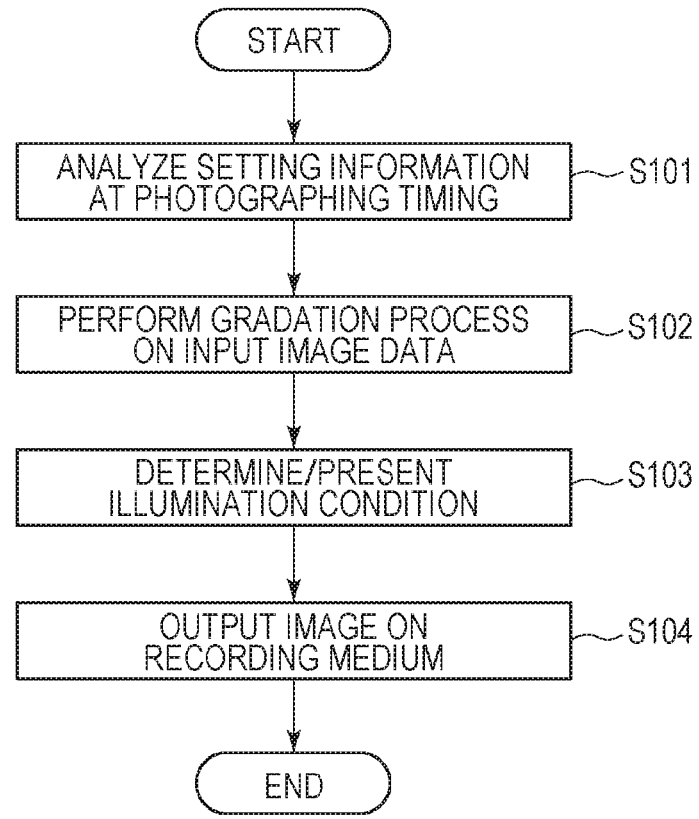
FIG. 8A is a flowchart illustrating a process according to a first embodiment and FIG. 8B illustrates a display unit.
Figure 9A:
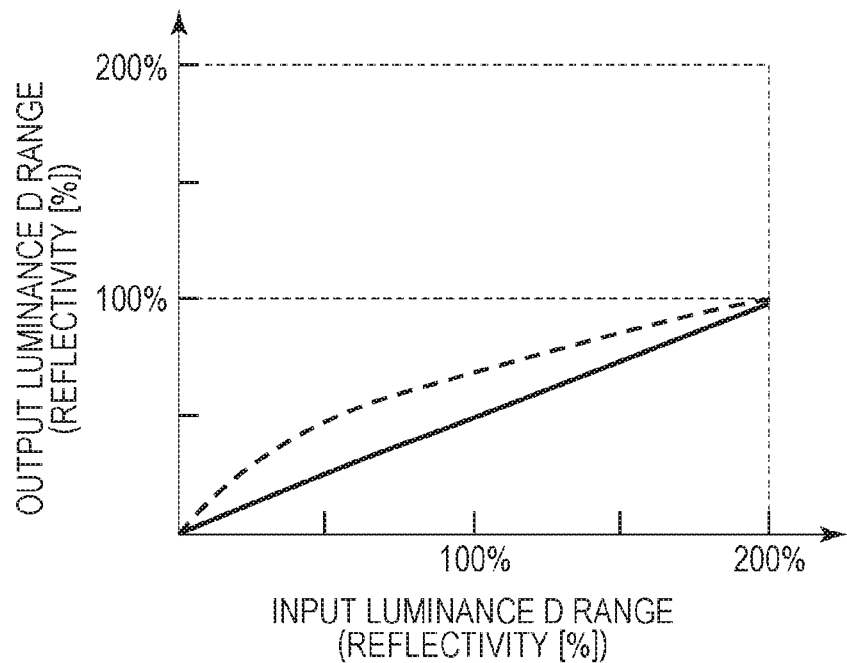
FIGS. 9A and 9B are diagrams for explaining conversion processing of image data.
Figure 9B:
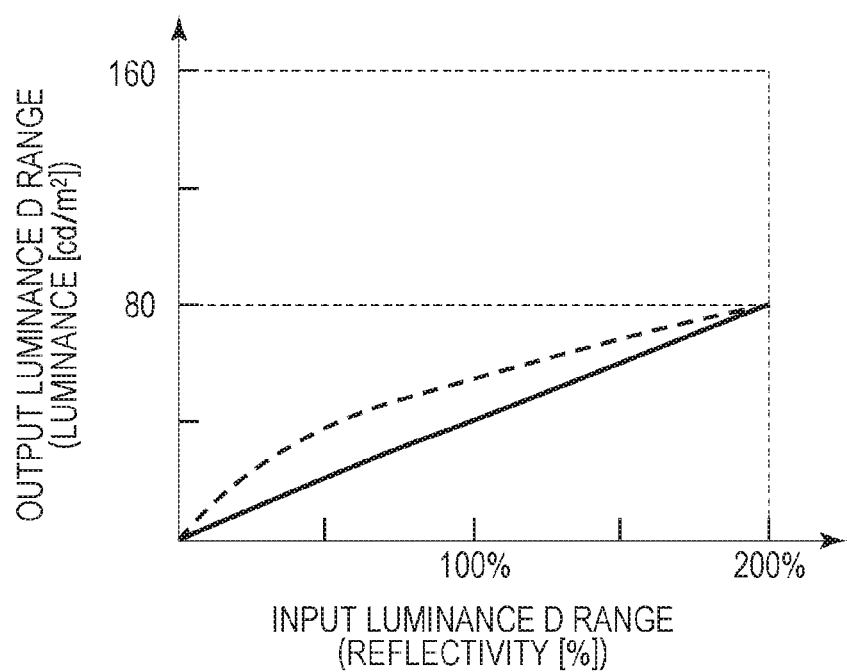

FIG. 8A is a flowchart illustrating a flow of processing described above. In step S101, the information of the input image data (RAW data) is analyzed. Here, exposure setting information at the photographing timing is acquired as information necessary for subsequent processing. According to the present embodiment, an aperture value A, an exposure time T, and an SV indicating the sensitivity of the photographing medium are acquired. In step S102, the luminance value of the input image data is converted into a print luminance value, and gradation processing is performed so that the linearly developed image falls within a luminance range of reflectivity of 0 to 100%. Here, FIG. 9A is a graph illustrating the gradation characteristics of the conversion processing performed in step S102, in which gradation characteristics in a case of performing the conventional image processing are represented by dotted lines, and gradation characteristics in a case of performing the image processing according to the present embodiment are represented by solid lines. FIG. 9B is a graph comparing the luminance between a case where the conventional image processing is performed under the normal illumination and a case where the image processing according to the present embodiment is performed. It can be seen that the solid line graph representing the image processing according to the present embodiment is a dark image over the entire gradation as compared to the dotted line graph representing the conventional image processing.

Figure 8B:
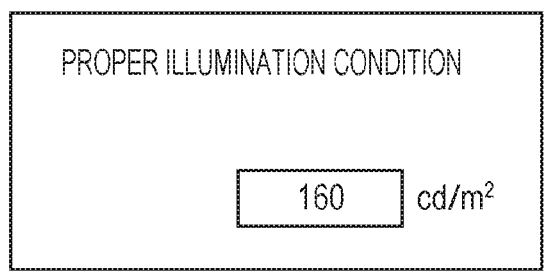

Referring back to FIG. 8A, in step S103, the luminance b is calculated using the above-described Equation, and is presented to the user. This is illumination condition required to return the luminance range converted in step S102 to the luminance range of the original input image data. FIG. 8B is a view illustrating a UI displayed on the display unit 102 of FIG. 1. Then, the luminance b derived by the above-described method is presented to an operator as an illumination condition for reproducing the brightness of the photographed state when viewing the print product.

Figure 10A:
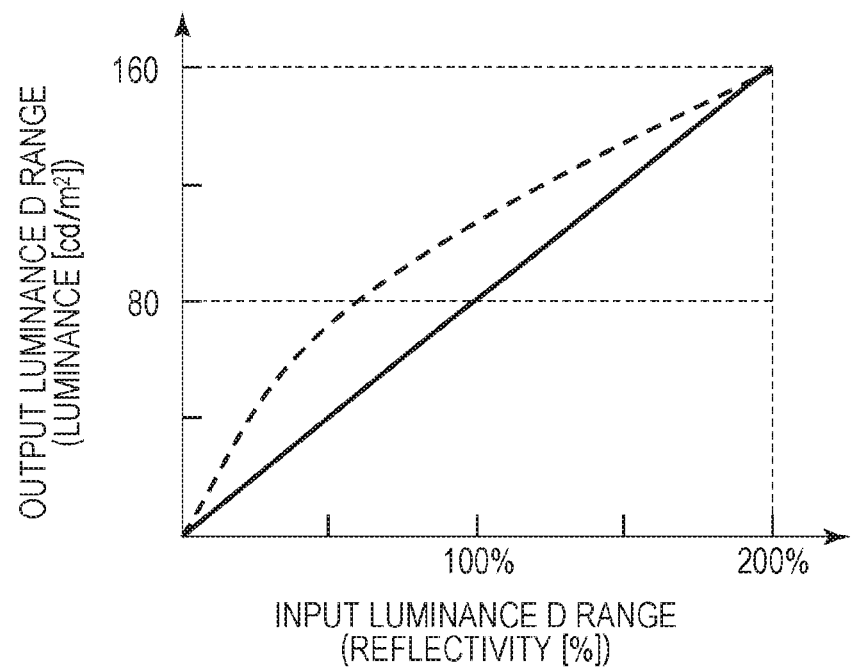
FIGS. 10A and 10B are graphs illustrating luminance gradation characteristics of print product.
Figure 10B:
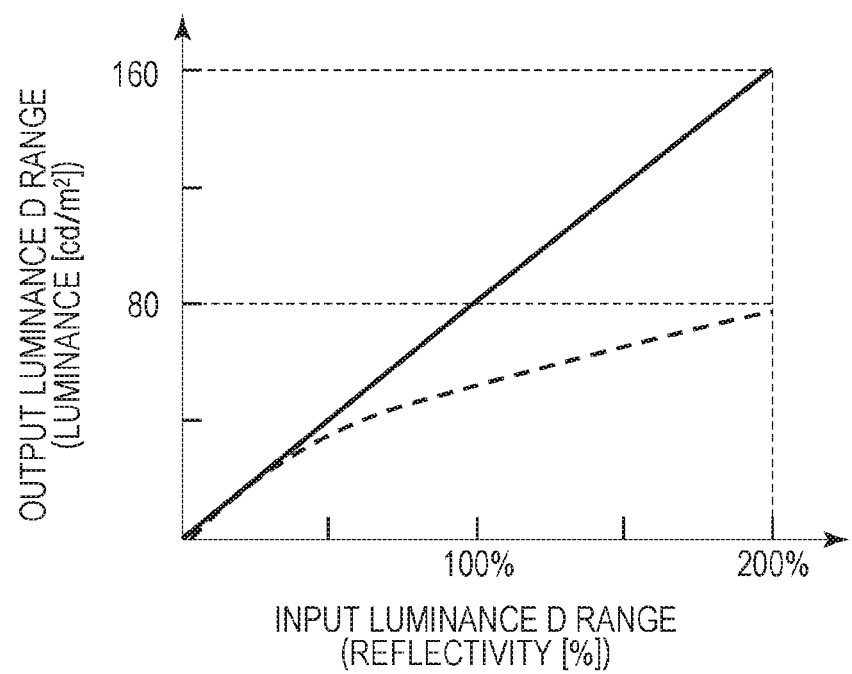

Finally, in step S104, the image data processed in step S102 is printed on a recording medium to generate a print product. Here, FIG. 10A is a graph illustrating luminance gradation characteristic of the print product printed in step S105 under the illumination condition presented in step S103. In this graph, the solid line represents a case where the image data subjected to the image processing according to the present embodiment is printed, and the dotted line represents a case where the image data subjected to the conventional image processing is printed as a comparative example. Further, in FIG. 10B, the solid line represents the luminance gradation characteristic of the print product of the image data subjected to the image processing according to the present embodiment under the illumination condition of the calculated luminance b. On the other hand, the dotted line represents the luminance gradation characteristic of the print product of the image data subjected to the conventional image processing under the normal illumination. Comparing these two gradation characteristics, the luminance gradation characteristic of the print product of the image data subjected to the image processing according to the present embodiment indicates linear gradation characteristic, and the luminance of the print product is the brightness of the photographed state that has been reproduced. Therefore, it can be thought that the photographed state can be reproduced more faithfully than the print product subjected to the conventional image processing.

Second Embodiment

According to the first embodiment described above, the exposure setting at the time of photographing is obtained through the image data input unit 201 and used when analyzing the brightness of the photographed state. This is not a problem when the luminance b illustrated in FIG. 7B is treated as a specified value, but may actually change depending on performance of an image sensing element of the camera used for photographing. Moreover, even when using the same camera, the range of maximum brightness that can be acquired may change depending on the photographed state. Therefore, in the present embodiment, a case where analysis is performed using the maximum reflectivity stored in the Exif information along with each image data will be described.

Figure 11:
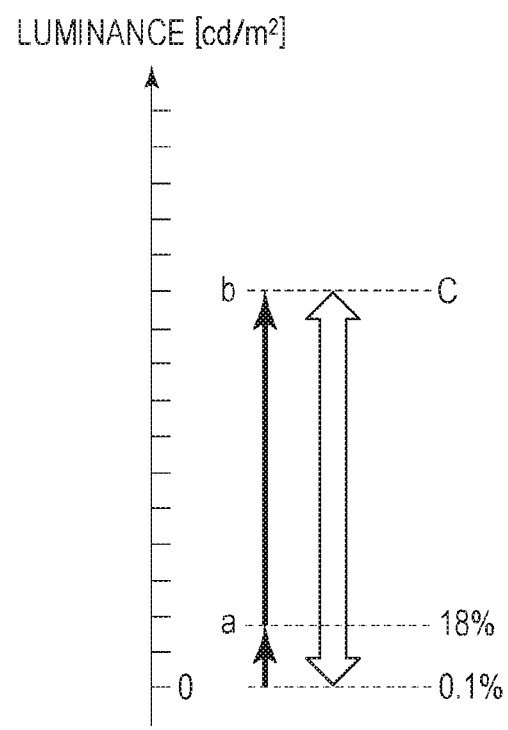
FIG. 11 is a conceptual diagram for deriving brightness of a photographed state according to a second embodiment.

In order to derive the brightness of the photographed state, as illustrated in FIG. 11, the state luminance B captured as a reflectivity of 18% at the time of photographing is determined using the above-mentioned Equation (7) based on the exposure setting at the time of photographing and the state luminance B is assumed as a. Furthermore, b can be derived by a ratio calculation of the following Equation (9) using a maximum reflectivity C included in the Exif information.

$$b = a \cdot C/18 \quad (F9)$$

Figure 12:
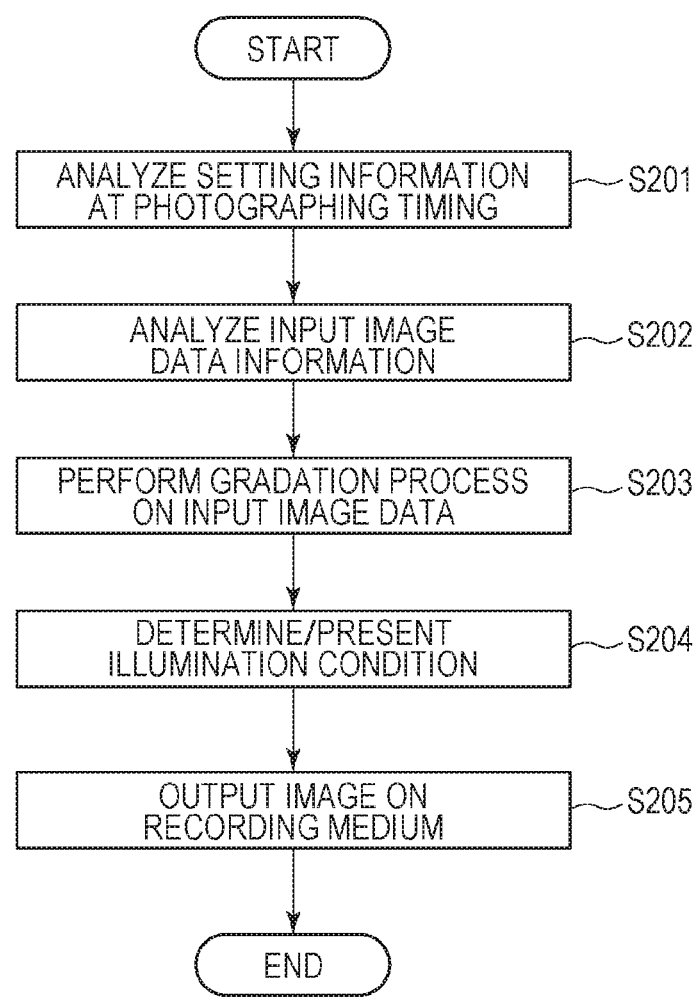
FIG. 12 is a flowchart illustrating a process according to the second embodiment.

FIG. 12 is a flowchart illustrating data processing according to the present embodiment. In step S201, the information of the input image data (RAW data) is analyzed. The information necessary for the subsequent processing is the exposure setting at the photographing timing. In step S202, the maximum reflectivity of the D range of the input image data is obtained by analyzing the data. In step S203, the luminance value of the input data is converted to a print luminance value, and gradation processing is performed so that the linearly developed underexposed image falls within the luminance range of reflectivity of 0 to 100%. In step S204, the luminance b is calculated using the above-described Equation (9) and presented to the user. This is the illumination condition needed to return the luminance range converted in step S203 to the original luminance range of the input data. Finally, in step S205, the image data processed in step S203 is printed on a recording medium to generate a print product.

With the above method, the brightness of a photographed state can be derived even when the maximum obtainable brightness changes depending on the performance of the image sensing element of the camera used for photographing, or even when the same camera is used but the range of maximum obtainable brightness varies depending on the photographed state.

Third Embodiment

According to the first and second embodiments described above, when showing an illumination condition to the user, the reflection luminance value [cd/m$^2$] of a white background of the recording medium is presented. On the other hand, according to the present embodiment, an illuminance [lx] of the exhibited face of the recording medium is presented. With this method, in a case of adjusting the brightness of the illumination, brightness of a photographed state can be reproduced if there is a device that measures illuminance of incident light, even when there is no device that measures the reflection brightness.

The reflectivity of the recording medium differs depending on the type of the recording medium. For example, when comparing photographic paper and plain paper, the plain paper generally has lower brightness in its white background. Therefore, when presenting an illumination condition with its illuminance, it is needed to use the reflectivity according to the type of the recording medium. There is a relationship between the illuminance E [lx] of the exhibited face of the recording medium and the luminance L [cd/m$^2$] of the reflecting face as expressed in the following equation.

$$E = \pi/\rho \cdot L \quad (10)$$

$\pi$ is a circle ratio, and $\rho$ is a reflectivity of the white background of the recording medium. Therefore, the illuminance E of the exhibited face of the recording medium can be obtained with the following Equation (11) by using Equation (10) with respect to the maximum reflection luminance b captured by the camera, which is illustrated in FIG. 11 in the second embodiment.

$$E = \pi/\rho \cdot b \quad (11)$$

Figure 13:
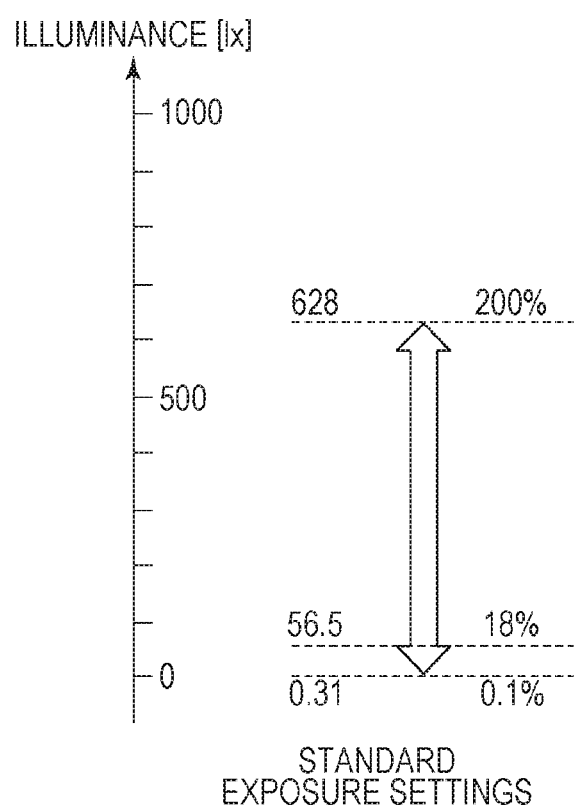
FIG. 13 is a conceptual diagram for deriving brightness of a photographed state according to a third embodiment.

Here, assuming that the reflectivity of the white background of a certain recording medium is 80% and the maximum reflection brightness b captured by the camera is 160 cd/m², the maximum illuminance of the exhibited face of the recording medium is derived as 628 lx by using (11). When the D range of the camera is converted from luminance to illuminance, the D range of the luminance illustrated in FIG. 7A corresponds to the D range of the illuminance illustrated in FIG. 13. Other parts are similar to those in the above embodiment.

Figure 14A:
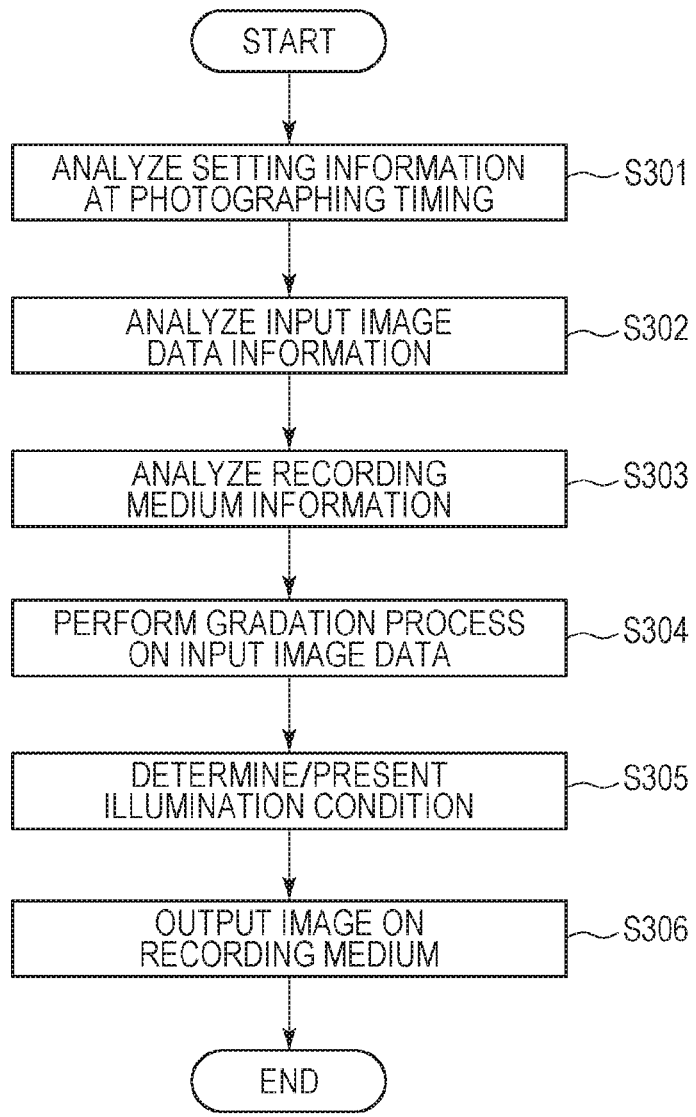
FIG. 14A is a flowchart illustrating a process according to the third embodiment and FIG. 14B illustrates a display unit.
Figure 14B:
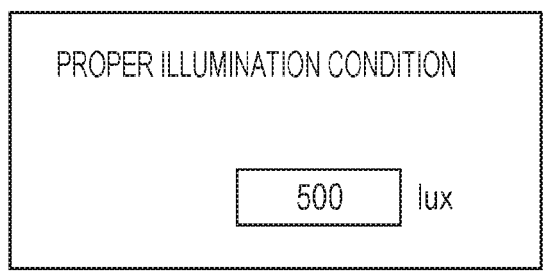

FIG. 14A illustrates a flow of data processing according to the present embodiment. Steps S301 and S302 are similar to steps S101 and S102 in the first embodiment. Next, in step S303, characteristic of the recording medium used for printing is obtained. Here, measurement is performed in advance and data stored in the storage medium is selected. Data needed for the subsequent processing is reflectivity of a white background of the recording medium. The reflectivity of each type of recording medium is stored in advance in a storage unit such as a ROM of the apparatus, and the reflectivity is obtained when the recording medium to be used is selected in step S303. In step S304, the luminance value of the input image data is converted into a print luminance value, and gradation processing is performed so that the linearly developed image falls within the luminance range of reflectivity of 0 to 100%. In step S305, the illumination condition needed to return the luminance range converted in step S304 to the original luminance range of the input data is calculated using b in FIG. 13 and Equation (11) and presented to the user. FIG. 14B is an example of presentation to the user, which is displayed on the display unit 102. Finally, in step S306, the image data processed in step S304 is printed on a recording medium to generate a print product.

As described above, according to the present embodiment, brightness of a photographed state is calculated using illuminance [lx]. Thus, the brightness of the photographed state can be reproduced if there is a device that measures illuminance of incident light, even when there is no device that measures the reflection brightness when adjusting the brightness of the illumination.

Fourth Embodiment

The present embodiment will describe an example of switching between a case of reproducing brightness of a photographed state using illumination and a case of normal image processing using normal illumination.

Figure 15:
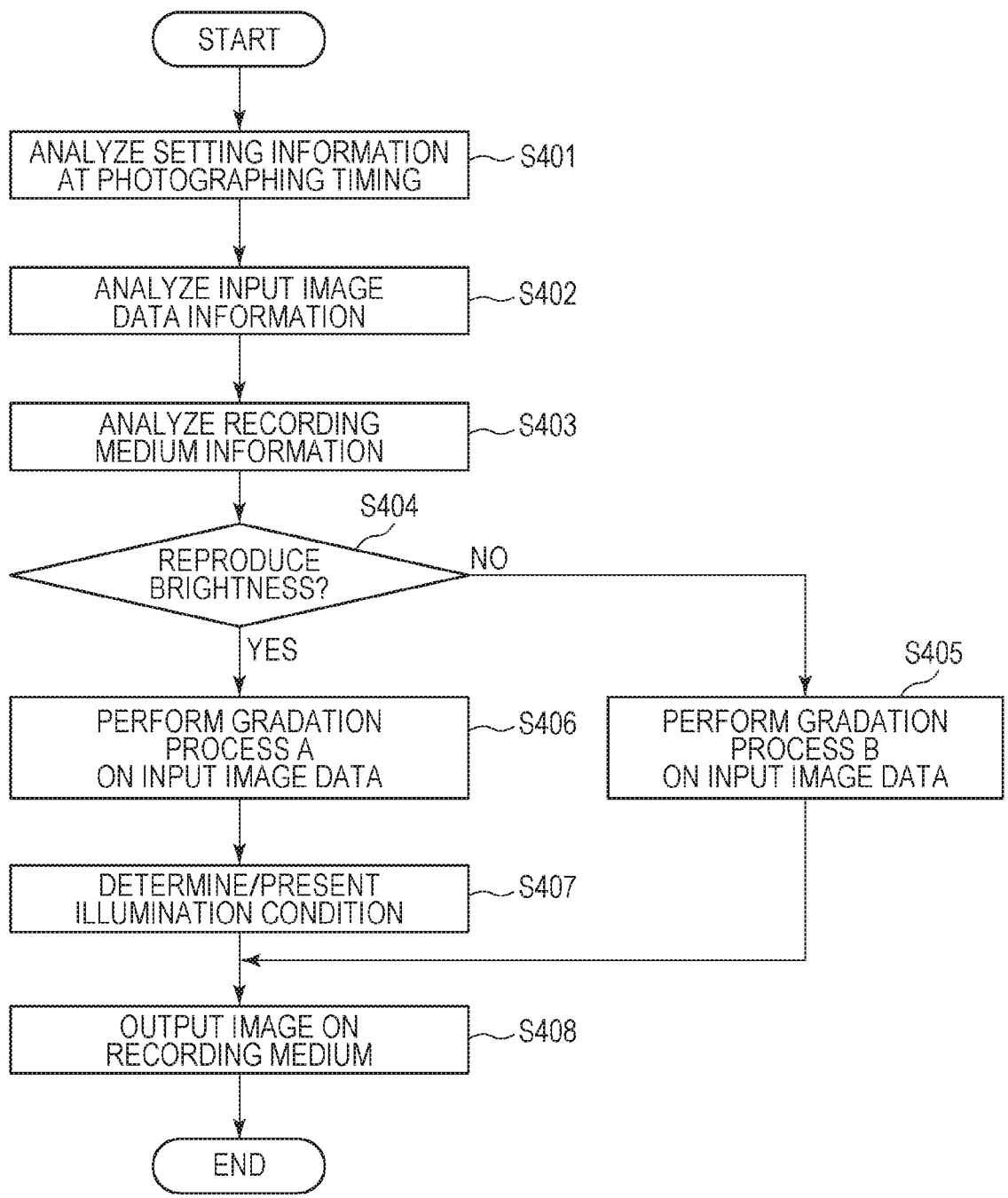
FIG. 15 is a flowchart illustrating a process according to a fourth embodiment.

FIG. 15 is a flowchart illustrating the processing according to the present embodiment. In step S401, the information of the input image data (RAW data) is analyzed. The information necessary for the subsequent processing is the exposure setting at the photographing timing. In step S402, the maximum reflectivity of the D range of the input image data is obtained by analyzing the data. Next, in step S403, the characteristic of the recording medium used for printing is obtained. Here, measurement is performed in advance, and data stored in the storage medium is selected. Data needed for the subsequent processing is reflectivity of a white background of the recording medium. Regarding a reflectivity of each type of recording medium, previously measured data is stored in a storage unit such as a ROM of the apparatus and obtained when a recording medium to be used is selected in step S403. In step S404, information on whether to reproduce the brightness of the photographed state of the input image data using illumination is obtained. Here, instruction information from the user is obtained. If "reproduction (YES)" is selected, image processing (image processing A) similar to that of the third embodiment is performed in step S406. On the other hand, when "no reproduction (NO)" is selected, the conventional image processing (image processing B) described with reference to FIG. 5B is performed in step S405. When "reproduction (YES)" is selected in step S404, an illumination condition for reproducing the photographed state is presented on the display unit 102 in step S407 following step S406, as in the third embodiment. Finally, in step S408, the image data processed in step S405 or step S406 is printed on a recording medium to generate a print product.

As described above, information of user's selection whether or not to reproduce the brightness of the photographed state using illumination is obtained, and the image processing of the disclosure is performed in a case of reproducing the brightness of the photographed state or conventional image processing is performed assuming normal illumination in a case of not reproducing the brightness. With this configuration, the user can select an exhibiting method when exhibiting a print product.

Fifth Embodiment

Although the illumination condition for reproducing the brightness of the photographed state has been presented to the user up to the fourth embodiment described above, the present embodiment will describe a control system including a control device that automatically controls an illumination device based on a calculated illumination condition. The method of calculating the illumination condition is similar to that of the above-described embodiment, and thus will not be described here.

Figure 16A:
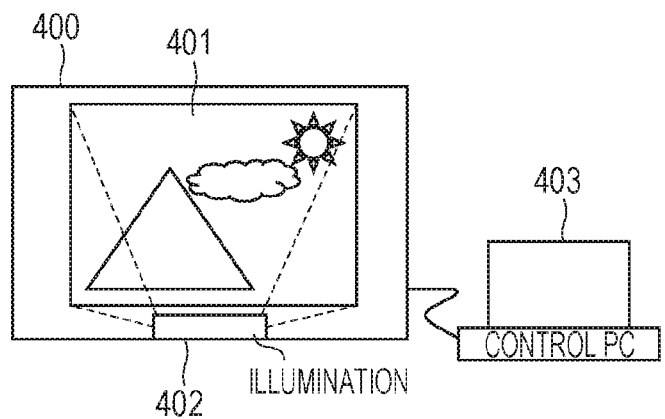
FIGS. 16A, 16B, and 16C are conceptual diagrams illustrating a control system according to a fifth embodiment.
Figure 16B:
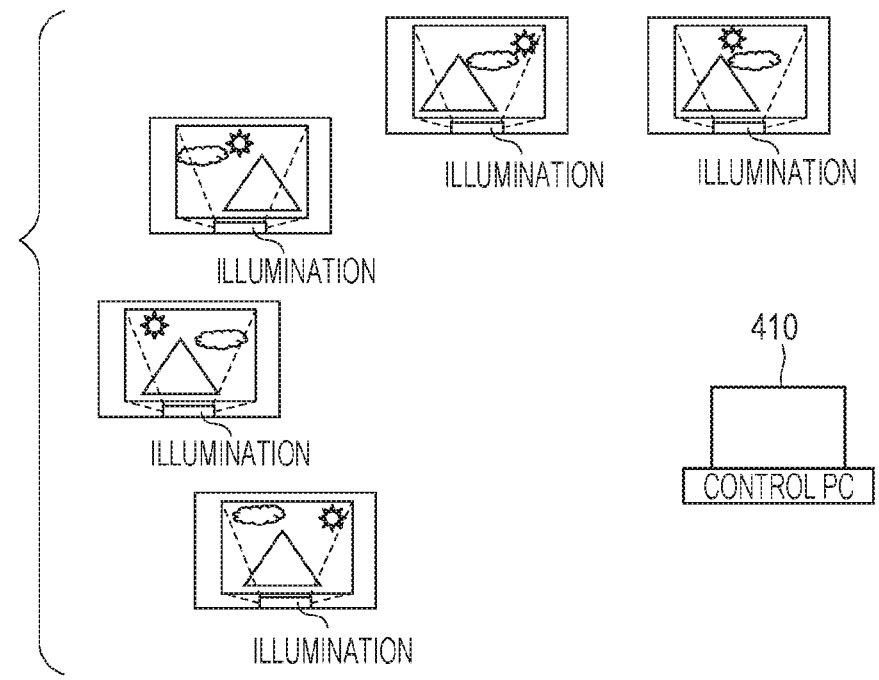
Figure 16C:
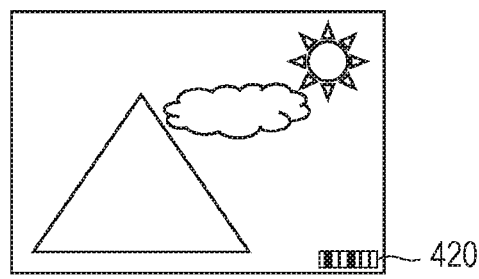

FIGS. 16A to 16C are conceptual diagrams for explaining the illumination device according to the present embodiment. In FIG. 16A, a print product 401 is disposed at a predetermined position of a main body of an illumination device 400. An optimal illumination condition is transmitted from a control Personal Computer (PC) 403 to the illumination device 400, and control is performed such that illumination light set under the transmitted lighting condition is emitted from an illumination 402 to the print product 401. The broken lines in the figure represent a condition in which light from the illumination 402 is given onto the print product 401. According to the present embodiment, the illumination condition is adjusted using the control PC 403; however; for example, the illumination device 400 may have a function of writing the illumination condition in a portable memory such as an SD card and reading the illumination condition.

As another display lighting system, as illustrated in FIG. 16B, there may be a system in which a plurality of illumination devices are connected to a central control PC 410 wirelessly using WiFi or the like, and the control PC 410 transmits an illumination condition necessary for an exhibited print product to the illumination devices. Further, as illustrated in FIG. 16C, the print product itself may be printed with an encrypted code 420 (which is a symbol such as a bar code) that represents an illumination condition. In this case, when the print product is attached to the illumination device, the reader incorporated in the device reads the encrypted code and automatically emits light under an optimal lighting condition. It is preferable to use a clear ink or the like for printing the encrypted code so that the encrypted code on the print product is inconspicuous.

With the configurations described above, a illumination device capable of automatically setting illumination under a illumination condition derived by the method described in the above-described embodiment can be provided.

The above embodiments have described examples in which the input image data is RAW image data; however, image data of any other format may be used. However, RAW image data is more preferable as input image data because it has a high number gradation levels of data and a wide dynamic range. Further, although an example in which linear gradation processing is performed on input image data has been described, substantially-linear gradation processing may be used to adjust some appearance without strictly-linear gradation processing. In addition, when the brightness of the exhibition illumination that can be prepared is insufficient for the derived brightness of the photographed state, the difference may be fed back to the image processing, and gradation processing may be performed in which gradient of the gradation curve becomes gentler in a higher luminance side without performing linear gradation processing. With such a method, although the reproducibility of the brightness of the photographed state is lowered, the reproduction with higher fidelity can be expected compared to viewing under the illumination environment of the conventional limited brightness. Further, although an example has been described in which input image data and information regarding a photographing condition are directly input from the photographing unit such as a camera to the input unit 101 of the image processing apparatus 100, the disclosure is not limited to this embodiment. For example, the information processing apparatus may be configured to receive input image data and information on a photographing condition from a storage medium such as a memory card.

By calculating the illumination condition at the time of exhibiting the print product using the illumination by the image processing apparatus of the disclosure, brightness of the state in which the image data is captured can be reproduced.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-131685, filed Jul. 11, 2018, which is hereby incorporated by reference herein in its entirety.

What is claimed is:

1. An information processing apparatus comprising:
a processor; and
a memory containing instructions that, when executed by the processor, cause the processor to perform operations comprising:
obtaining exposure setting information at a photographing timing of image data obtained by a photographing unit;
deriving a luminance value of a subject captured by the photographing unit with a predetermined reflectivity at the photographing timing, based on the exposure setting information at the photographing timing obtained in the obtaining; and
deriving an illumination condition for reproducing a brightness of a photographed state based on the luminance value derived and a maximum dynamic range captured by the photographing unit.

2. The information processing apparatus according to claim 1, wherein the exposure setting information includes a value related to exposure setting and a value related to sensitivity of a photographing medium.

3. The information processing apparatus according to claim 2, wherein the value related to the exposure setting is a value related to an aperture and a value related to exposure time.

4. The information processing apparatus according to claim 1, wherein
the maximum dynamic range is obtained based on a maximum reflectivity included in Exif information of the image data.

5. The information processing apparatus according to claim 1, wherein the illumination condition is derived as a reflection luminance value of a white background of a recording medium.

6. The information processing apparatus according to claim 1, wherein
the illumination condition is derived based on a reflectivity of a white background of the recording medium, as illuminance of an exhibited face of a recording medium.

7. The information processing apparatus according to claim 1, further comprising
a display unit configured to display the illumination condition derived.

8. The information processing apparatus according to claim 1, wherein the illumination condition is a condition for emitting light having illuminance higher than illuminance of a normal illumination light, in a case of exhibiting a print product that an image based on the image data is printed on a recording medium.

9. The information processing apparatus according to claim 1, wherein the predetermined reflectivity is 18%.

10. The information processing apparatus according to claim 1, wherein the illumination condition is derived from Formula 1:

$$b = a \times c / 18$$

where a is the luminance value derived, b is the illumination condition, and c is maximum dynamic range.

11. A control system comprising:
an information processing apparatus comprising:
a processor; and
a memory containing instructions that, when executed by the processor, cause the processor to perform operations comprising:
obtaining exposure setting information at a photographing timing of image data obtained by a photographing unit;
deriving a luminance value of a subject captured by the photographing unit with a predetermined reflectivity at the photographing timing based on the exposure setting information at the photographing timing obtained in the obtaining; and
deriving an illumination condition for reproducing a brightness of a photographed state based on the luminance value derived and a maximum dynamic range captured by the photographing unit, wherein the illumination condition is a condition for emitting light having illuminance higher than illuminance of a normal illumination light, in a case of exhibiting a print product that an image based on the image data is printed on a recording medium; and
a control device configured to control illumination for emitting light to the print product based on the illumination condition derived.

12. The control system according to claim 11, wherein the control device is wirelessly connected to the information processing apparatus.

13. An image processing system comprising:
an information processing apparatus comprising:
a processor; and
a memory containing instructions that, when executed by the processor, cause the processor to perform operations comprising:
obtaining exposure setting information at a photographing timing of image data obtained by a photographing unit;
deriving a luminance value of a subject captured by the photographing unit with a predetermined reflectivity at the photographing timing, based on the exposure setting information at the photographing timing obtained in the obtaining,
deriving an illumination condition for reproducing a brightness of a photographed state based on the luminance value derived and a maximum dynamic range captured by the photographing unit, wherein the illumination condition is a condition for emitting light having illuminance higher than illuminance of a normal illumination light, in a case of exhibiting a print product that an image based on the image data is printed on a recording medium; and
an image output device configured to print the print product based on output luminance data,
wherein the output luminance data is generated based on the image data and a luminance dynamic range of the output luminance data is narrower than a luminance dynamic range of the image data.

14. The image processing system according to claim 13, wherein the output luminance data is generated by linear-converting the image data.

15. The image processing system according to claim 13, wherein the image data is RAW image data.

16. An information processing method comprising:
obtaining exposure setting information at a photographing timing of image data obtained by a photographing unit;
deriving a luminance value of a subject captured by the photographing unit with a predetermined reflectivity at the photographing timing, based on the exposure setting information at the photographing timing obtained in the obtaining; and
deriving an illumination condition for reproducing a brightness of a photographed state based on the luminance value derived and a maximum dynamic range captured by the photographing unit.

17. The information processing method according to claim 16, wherein the exposure setting information includes a value related to exposure setting and a value related to sensitivity of a photographing medium.

18. The information processing method according to claim 17, wherein the value related to the exposure setting is a value related to an aperture and a value related to exposure time.

19. The information processing method according to claim 16, wherein
the maximum dynamic range is obtained based on a maximum reflectivity included in Exif information of the image data.

20. The information processing method according to claim 16, wherein the illumination condition is derived as a reflection luminance value of a white background of a recording medium.

21. The information processing method according to claim 16,
wherein the illumination condition is derived based on a reflectivity of a white background of a recording medium, as illuminance of an exhibited face of the recording medium.

22. The information processing method according to claim 16, further comprising
displaying the illumination condition derived.

* * * * *